US009339756B1

(12) United States Patent
Bela (10) Patent No.: US 9,339,756 B1
(45) Date of Patent: May 17, 2016

(54) CLAUS HYDROCARBON DESTRUCTION VIA STAGED SOLVENT REGENERATION (71) Applicant: Frank Bela, Monrovia, CA (US)

(72) Inventor: Frank Bela, Monrovia, CA (US)

(*) Notice: Subject to any disclaimer, the term of this patent is extended or adjusted under 35 U.S.C. 154(b) by 0 days.

(21) Appl. No.: 14/991,802

(22) Filed: Jan. 8, 2016

Related U.S. Application Data (62) Division of application No. 13/605,643, filed on Sep. 6, 2012, now Pat. No. 9,259,680.

(60) Provisional application No. 61/531,557, filed on Sep. 6, 2011.

(51) Int. Cl.
B01D 53/14 (2006.01)
B01D 53/96 (2006.01)
C01B 17/04 (2006.01)
B01D 19/00 (2006.01)

(52) U.S. Cl.
CPC ........ B01D 53/1425 (2013.01); B01D 53/1468 (2013.01); C01B 17/0413 (2013.01); B01D 2252/20478 (2013.01)

(58) Field of Classification Search
None
See application file for complete search history.

(56) References Cited

U.S. PATENT DOCUMENTS

| 2,747,962 | A | 5/1956 | Heitz et al. |
| 3,563,695 | A | 2/1971 | Benson |
| 3,970,743 | A | 7/1976 | Beavon |
| 4,073,863 | A | 2/1978 | Giammarco et al. |
| 4,085,192 | A | 4/1978 | Van Scoy |
| 4,299,801 | A | 11/1981 | Lynn et al. |
| 4,406,868 | A | 9/1983 | Carter et al. |
| 4,710,362 | A | 12/1987 | Nieh |
| 5,558,698 | A | 9/1996 | Baker et al. |
| 5,983,663 | A | 11/1999 | Sterner |
| 6,800,120 | B1 | 10/2004 | Won et al. |
| 7,377,967 | B2 | 5/2008 | Reddy et al. |
| 7,635,408 | B2 | 12/2009 | Mak et al. |
| 7,648,692 | B2 * | 1/2010 | Chow ............... B01D 53/8603 422/634 |
| 7,785,399 | B2 | 8/2010 | Huang et al. |
| 7,901,488 | B2 | 3/2011 | Rochelle et al. |

(Continued)

OTHER PUBLICATIONS

Clark, P.D. et al., Understanding Claus Furnace Chemistry: Development of a "Modified" Claus for Low $H_2S$-Content Acid Gases, Symposium, Mar. 1-4, 1998, pp. 241-263, Alberta Sulphur Research Ltd., Calgary, Alberta, Canada.

(Continued)

Primary Examiner — Joseph D Anthony
(74) Attorney, Agent, or Firm — Lewis Roca Rothgerber Christie LLP (57) ABSTRACT A solvent for absorbing $H_2S$ and $CO_2$ is regenerated using two regenerators. Rich solvent is fed to a first regenerator producing a first acid gas stream from the top, and a partially regenerated solvent from the bottom. The partially regenerated solvent is fed to a second regenerator producing an overhead vapor stream from the top and a lean solvent stream from the bottom. A portion of the second regenerator overhead vapor stream may be cascaded to the first regenerator to contact rich solvent. The first acid gas stream and the remaining second regenerator overhead vapor stream are respectively fed to the first and second reaction zones of a two-stage Claus reaction furnace. Substantially all volatile organic contaminants are stripped in the first regenerator, and thus favorably destroyed in the first reaction furnace zone by virtue of higher local combustion temperatures and closer approach to oxidizing conditions.

8 Claims, 4 Drawing Sheets

(56) References Cited

U.S. PATENT DOCUMENTS

| | | | |
|---|---|---|---|
| 7,918,926 | B2 | 4/2011 | Iijima et al. |
| 8,088,200 | B2 | 1/2012 | Wagner et al. |
| 8,192,530 | B2 | 6/2012 | Handagama et al. |
| 2004/0060334 | A1 | 4/2004 | Palmer |
| 2008/0019899 | A1* | 1/2008 | Mak ............... B01D 53/1406 423/437.1 |
| 2008/0127831 | A1* | 6/2008 | Rochelle ............. B01D 3/143 96/181 |
| 2009/0004096 | A1* | 1/2009 | Chow ............... B01D 53/8603 423/574.1 |
| 2009/0151566 | A1* | 6/2009 | Handagama ....... B01D 53/1425 95/187 |
| 2010/0219061 | A1 | 9/2010 | Al Utaibi et al. |

OTHER PUBLICATIONS

Colozzi, Michele et al., Process Strategies for Acid Gas Enrichment, Technip KTI, Aug. 2006, 11 pages.

Crevier, Pierre P. et al., Evaluating Solutions to BTX Deactivation of Claus Catalyst in Lean Feed SRUs, Symposium, Sep. 9-13, 2002, 22 pages, Brimstone Engineering, Vail Sulphur Symposium.

Ismailian, Fred et al., Pushing the Claus Envelope 10% H2S Acid Gas with Significant Aromatics, Symposium, Feb. 23-26, 2003, pp. 213-228, Petro-Canada Oil and Gas, Calgary, Alberta, Canada.

Iyengar, J.N. et al., Operations and Recovery Improvement Via Heavy Hydrocarbon Extraction, Symposium, Mar. 1-4, 1998, pp. 161-174, Laurance Reid Gas, Norman, Oklahoma.

Klint, Bruce et al., Hydrocarbon Destruction in the Claus SRU Reaction Furnace, Symposium, Feb. 27, 2000, 21 pages, Sulphur Experts Inc., Calgary, Canada.

Lamar, Justin A. et al., Enhanced Sulfur Recovery From Lean Acid Gases, Reprise . . . The Impact of the Upstream Acid Gas Removal Unit, Proceedings of the 2010 Laurence Reid Gas Conditioning Conference, Norman, OK, pp. 181-198.

Miller, David Truett et al., Unique Acid Gas Enrichment Application, Symposium, Feb. 25-28, 2001, 10 pages, Laurance Reid Gas, Norman, Oklahoma.

Sabapathi K.S. et al., Optimization of Unit Operations with Organic Sulfur in the Gas Feed (RSH, COS) to Meet the TGT Emission Limit, Proceedings of the 2009 Laurence Reid Gas Conditioning Conference, Norman, OK, pp. 131-146.

Sardesai, Ulhas et al., Using Conventional Claus Technology on Lean Acid Gas Feeds, Journal, Westfield Engineering & Services, Houston, Texas, Proceedings of the 1998 Laurence Reid Gas Conditioning Conference, Norman, OK, 27 pages.

Seagraves, Jenny et al., Fundamentals—Gas Sweetening, Symposium, Feb. 21-24, 2010, 60 pages, Laurance Reid Gas, Norman, Oklahoma.

Slavens, Angela et al., Enhanced Sulfur Recovery from Lean Acid Gases Containing COS and Mercaptans, Proceedings of the 2010 Laurence Reid Gas Conditioning Conference, Norman, OK, pp. 257-278.

Tonjes, Mark et al., New Approaches to Processing Lean Acid Gases, 2010, pp. 105-106.

Vorberg, Gerald et al., A new generation of promoter for selective $H_2S$ removal, 2011 Proceedings of the Laurence Reid Gas Conditioning Conference, Norman, OK, pp. 281-311.

Weiland, Ralph H. et al., Acid Gas Enrichment—Maximizing Selectivity, 2008, pp. 337-351, Optimized Gas Treating Inc.

* cited by examiner

CLAUS HYDROCARBON DESTRUCTION VIA STAGED SOLVENT REGENERATION

CROSS REFERENCE TO RELATED APPLICATION

This application is a Divisional of U.S. application Ser. No. 13/605,643 filed Sep. 6, 2012, now U.S. Pat. No. 9,259,680 which claims the benefit of U.S. Provisional Application No. 61/531,557 filed Sep. 6, 2011, the entire contents of all of which are incorporated herein by reference.

FIELD OF THE INVENTION

The present invention relates to the regeneration of a rich solvent stream used in removing hydrogen sulfide ($H_2S$) from gaseous and liquid streams to generate a lean solvent stream and an acid gas stream containing $H_2S$ to be converted to elemental sulfur according to the Claus sulfur recovery process.

BACKGROUND OF THE INVENTION

A wide variety of regenerable solvents are used to absorb $H_2S$ from hydrocarbon, hydrogen ($H_2$), syngas, flue gas, waste gas, and other gaseous and liquid streams. Often, such streams also contain carbon dioxide ($CO_2$), and at least some $CO_2$ is typically absorbed along with the $H_2S$, either inadvertently or intentionally. Other miscellaneous contaminants which may be absorbed include mercaptans, disulfides, hydrogen cyanide (HCN), ammonia ($NH_3$), and various organic compounds, particularly, heavy hydrocarbons including aromatics.

$H_2S$ solvent absorption mechanisms can generally be classified as chemical absorption mechanisms which involve chemical reactions, physical absorption mechanisms based on favorable solubility, or combinations of the two. Common examples of chemical solvents are aqueous solutions of alkanolamines such as monoethanolamine (MEA), diethanolamine (DEA), or methyldiethanolamine (MDEA). Alkanolamines are bases which react with $H_2S$ and $CO_2$ to form weakly bound soluble salts which become unstable at elevated temperatures, thus reverting to the original gas which can then be stripped from solution by a carrier vapor, usually steam generated by reboiling the regenerator bottoms.

Examples of physical solvents include N-methyl-2-pyrrolidone (NMP) as used in the Lurgi GmbH Purisol process, propylene glycol as used in the Fluor Solvent process, homologues of the dimethylether of polyethylene glycol as used in the UOP Selexol process, refrigerated methanol as used in the Lurgi Rectisol process and morpholine derivatives as used in the Krupp Uhde Morphysorb process which have particular affinity for aromatics as well as $H_2S$.

Examples of combined solvents include the various Shell Sulfinol solvents which combine the physical solvent sulfolane with a chemical solvent such as diisopropanolamine (DIPA) or MDEA.

Absorbers, or contactors, are used to contact the gas or liquid stream to be treated with such solvents to remove $H_2S$ and $CO_2$. The solvent leaving the absorber is rich in $H_2S$, and therefore, is generally referred to as a "rich" or "fat" solvent while the solvent fed to the absorber is referred to as "lean" solvent. A rich solvent can be regenerated by various means using heat, pressure reduction, partial-pressure reduction, or combinations thereof to strip the $H_2S$, $CO_2$, and volatile contaminants using a stripping or carrier vapor, which is usually steam and/or solvent vapor, in order to produce a lean solvent that can be recycled back to the absorbers for further $H_2S$ and/or $CO_2$ removal. The $H_2S$ and $CO_2$ that have been removed from the rich solvent by the regeneration process are collectively referred to as "acid gas" following condensation of the associated carrier vapor and subsequent separation.

Elemental sulfur is often recovered from the acid gas using processes such as the modified Claus sulfur recovery process. The modified Claus process typically begins with partial combustion of the acid gas with an oxygen ($O_2$) source in a reaction furnace, or thermal reactor. The $O_2$ source can be air, $O_2$-enriched air or essentially pure $O_2$. Of course, ambient air is typically the most convenient and economical source of $O_2$ for such a reaction furnace. The amount of $O_2$ fed to the reaction furnace is controlled to oxidize nominally one third of the $H_2S$ to sulfur dioxide ($SO_2$) according to Equation 1:

$$H_2S + 1.5O_2 \rightarrow SO_2 + H_2O + \Delta H \tag{1}$$

The $SO_2$ generated by Equation 1 then reacts with the remaining two-thirds of the $H_2S$ to form sulfur and water vapor according to the Claus reaction as shown in Equation 2:

$$2H_2S + SO_2 \rightarrow 3S + 2H_2O + /\Delta H \tag{2}$$

Most $CO_2$ in the acid gas fed to the reaction furnace is basically inert, and passes through the reaction furnace unchanged. Most other contaminants present in the stream are ideally combusted to generally inert products. However, for so-called "lean" acid gas feeds containing relatively low concentrations of $H_2S$ and correspondingly high concentrations of $CO_2$, problems can arise in that the inert $CO_2$ acts as a diluent, reducing the flame temperature in the reaction furnace. This can make it difficult to control the desired reactions. Where ambient air is used as the source of $O_2$, feed gas concentrations of less than 40 vol % $H_2S$ can result in insufficient flame temperatures for proper combustion. In particular, the low flame temperatures resulting from combustion of a lean acid gas feed may not be adequate for complete destruction of contaminants. For example, such contaminants can include organic materials such as hydrogen cyanide (HCN), mercaptans, disulfides, or hydrocarbons. Particularly problematic are aromatics such as benzene, toluene, ethylbenzene and xylenes, collectively known as BTEX, which are likely to be incompletely destroyed at flame temperatures below 2000-2200° F. Incomplete destruction can result in contamination of the sulfur product or fouling of downstream equipment or catalyst. Certain studies indicate that even 10-20 ppm of BTEX can result in severe catalyst deactivation within a short period of time. Residual BTEX levels of less than 1 ppm are desirable to reasonably ensure negligible adverse impact, while higher residual levels of simpler hydrocarbons less prone, for example, to downstream polymerization are tolerable.

In some cases, lean acid gas feeds may be accommodated by the use of a two-zone reaction furnace where 35-50% of the total $H_2S$ in the acid gas feed is combusted in a first, or primary, reaction zone for increased flame temperatures, with the remaining $H_2S$ fed to a second reaction zone in which there is negligible residual $O_2$. Since 1600-1800° F. is generally considered a safe minimum for flame stability, splitting the acid gas feed can be a simple means of achieving stable combustion with $H_2S$ concentrations as low as 25 vol %. However, this becomes impractical in the presence of many contaminants, as those contaminants bypassed to the second zone will not be adequately destroyed at the lower temperature.

Other methods of handling lean acid gas feeds include preheating the acid gas feed and/or the combustion air. For example, high-pressure steam, heat transfer fluid, fired heaters, molten salt baths or electric resistance can be used to heat the acid gas feed, the combustion air, or both. However, the increase in flame temperature is generally limited to 300-400° F. using such methods.

Another method of handling lean acid gas feeds is $O_2$ enrichment of the combustion air up to the use of relatively pure $O_2$. The use of $O_2$-enriched air can be an effective means of increasing temperature while also reducing equipment size. However, the operating cost can be high and such methods tend to be poorly suited to remote locations or hot climates.

Still another method of handling a lean acid gas feed is the selective absorption of $H_2S$ over $CO_2$ in cases where $CO_2$ removal is not required. Selective absorption typically takes advantage of higher $H_2S$ chemical reaction, and hence absorption, rates (as opposed to equilibria) by the use of specialty solvents combined with limited mass transfer surface and contact time in order to selectively absorb $H_2S$ while allowing the $CO_2$ to "slip". However, optimization of mass transfer elements is often difficult to predict and tends to vary with rate. The amount of $CO_2$ that can be slipped without also slipping $H_2S$ can also be limited, and potential undesirable organics may still be absorbed. Still further, such methods are not effective where it is desirable to remove both $H_2S$ and $CO_2$ from the stream to be treated.

Acid gas enrichment is yet another option. While many such schemes exist, most involve low-pressure selective re-absorption of the $H_2S$ from the initial acid gas stream followed by a second solvent regeneration step to yield a second acid gas stream of higher $H_2S$ concentration. Such processes invariably require high capital and result in high operating costs. Since designs must typically limit mass transfer contact to avoid $CO_2$ equilibrium, operating envelopes are more constrained. Furthermore, selective re-absorption often has the advantage of rejecting some, though seldom all, undesirable organics, but the disadvantage of also rejecting weakly acidic or neutral sulfur compounds such as mercaptans, carbonyl sulfide (COS) and carbon disulfide ($CS_2$), thus resulting in increased SOx emissions to the environment. Other potential means of minimizing acid gas contamination with aromatics in particular include fuel gas stripping of the rich solvent, condensation from the acid gas via refrigeration and adsorption from the acid gas using a regenerable molecular sieve, silica gel, or activated carbon bed, invariably at substantial expense.

SUMMARY OF THE INVENTION

Embodiments of the present invention are directed to methods and systems for regenerating a rich solvent stream comprising solvent, $H_2S$, $CO_2$, and at least one volatile contaminant. The rich solvent is regenerated to remove at least a portion of each of the $H_2S$, the $CO_2$, and the at least one contaminant, thereby producing a lean solvent stream. The $H_2S$, $CO_2$, and contaminant removed are to be fed to a Claus sulfur recovery unit of the type including a two-zone reaction furnace comprising first and second reaction zones. Suitable solvents include chemical solvents, physical solvents, and combinations thereof. The contaminants can include one or more of organic materials such as HCN, mercaptans, disulfides, light hydrocarbons, or heavy hydrocarbons, in particular aromatics such as benzene, toluene, ethyl toluene, or xylenes, collectively known as BTEX.

The rich solvent stream is fed to a first regenerator where it contacts a carrier vapor stream which strips at least a portion of the $H_2S$, the $CO_2$, and the at least one volatile contaminant from solution. The first regenerator produces a partially regenerated solvent stream from a lower section and a first acid gas stream from an upper section. The first acid gas stream comprises a first concentration of $H_2S$, a first concentration of $CO_2$, and substantially all of the contaminant, and is fed to the first reaction zone of the two-zone reaction furnace.

The partially regenerated solvent stream from the first regenerator is fed to a second regenerator where it contacts a similar carrier vapor stream to further strip residual $H_2S$ and $CO_2$ from solution. The second regenerator produces the lean solvent stream from a lower section. A heat exchanger, such as a reboiler, typically employs indirect heat to vaporize a portion of the liquid from the lower section of the second regenerator and the resulting vapor is used as the carrier vapor in both the first and second regenerators. A second acid gas stream produced from an upper section of the second regenerator, comprising a second concentration of $H_2S$, a second concentration of $CO_2$, and negligible contaminant, is fed to the second reaction zone of the two-zone reaction furnace.

In one embodiment, the entire carrier vapor stream generated within the reboiler is fed to the lower section of the second regenerator. A portion of the overhead vapor stream from the second regenerator, comprising carrier vapor and acid gas, is sent to the bottom of the first regenerator to effect the desired stripping. According to embodiments of the invention, by virtue of optimized design of the first regenerator, the first concentration of $H_2S$ is preferably greater than the second concentration of $H_2S$ and the first concentration of $CO_2$ is correspondingly less than the second concentration of $CO_2$. In some cases at least, $H_2S$ enrichment of the first acid gas stream from the first regenerator can be improved by removing heat from the portion of the overhead vapor stream cascaded from the second regenerator to the first regenerator.

In a second embodiment, a first portion of the carrier vapor stream generated, for example, within the reboiler is produced to the bottom of the first regenerator, the remaining second portion of the carrier vapor is produced to the bottom of the second regenerator, and the entire acid gas stream from the second regenerator is produced to the second zone of the two-zone reaction furnace.

BRIEF DESCRIPTION OF THE DRAWINGS

The accompanying drawings, together with the specification, illustrate various aspects and embodiments of the invention where.

DETAILED DESCRIPTION OF THE INVENTION

According to an embodiment of the present invention, a staged process for regeneration of rich solvent is used to produce two acid gas streams with different properties. The make-up of the first acid gas stream is optimized to include incidental components that are better suited to the high flame temperature of a first reaction zone of a two-zone Claus reaction furnace, and the make-up of the second acid gas stream is optimized to include components that are suitable for a cooler second reaction zone of the two-zone Claus reaction furnace. Since Claus reaction stoichiometry limits combustion air to that required to oxidize nominally one-third of the total $H_2S$ to be converted, the local flame temperature of the first reaction zone is effectively maximized when nominally one-third of the total $H_2S$ is routed to the first zone. Furthermore, contaminants that may be destroyed by high temperature incineration are preferentially routed to the higher temperatures of the first reaction zone. Still further, where the feed to the Claus reaction furnace includes high concentrations of inert gases such as $CO_2$, the combustion temperature of the first reaction zone can often be increased by optimizing first-stage mass transfer so that the $H_2S$ of the first acid gas stream routed to the first reaction zone is at a higher concentration than that of the second acid gas stream, and conversely, the concentration of the $CO_2$ in the first acid gas is lower than that of the second acid gas stream.

According to the present invention, this is accomplished by the use of a staged regeneration process wherein a rich solvent stream is regenerated in a series of two stages. According to an embodiment of the invention, a rich solvent stream which, as an example, is assumed to be an aqueous alkanolamine solution, is fed to a first stage where it contacts vapor comprising a carrier vapor (steam in this case) and desorbed acid gas. A partially regenerated solvent stream is produced from the bottom of the first stage to a second stage for further contact with the carrier vapor. According to this embodiment, a portion of the overhead vapor, comprising carrier vapor and acid gas, from the second stage is routed to the bottom of the first stage, preferentially stripping hydrocarbons and other volatile organic contaminants from the solvent in the first stage. A first acid gas stream from the first stage is routed to the first combustion zone of the two-zone reaction furnace of a modified Claus sulfur recovery unit, while the portion of acid gas from the second stage not cascaded to the first stage is routed to the second reaction furnace zone. The rate of the overhead vapor cascaded from the second regeneration stage to the first stage is adjusted to achieve a given fraction of total $H_2S$ to the first reaction furnace zone which optimizes combustion conditions for sufficiently complete oxidation of contaminants to avoid or mitigate adverse impacts such as flame instability, downstream acid corrosion, catalyst deactivation and fouling of downstream equipment. By so routing substantially all contaminants to the first reaction furnace zone, staged regeneration permits (1) maximization of the local combustion zone temperature by virtue of closer approach to oxidizing conditions and (2) intentional further enrichment of so-called lean-feed acid gas streams to the primary combustion zone with hydrocarbon gas to further increase flame temperatures if warranted, without risk of generating soot or undue quantities of problematic byproducts such as $CS_2$. The quantity of $H_2S$ to the first zone will typically be within the range of 30-50% of the total $H_2S$, wherein 40% is generally optimal.

Figure 1:
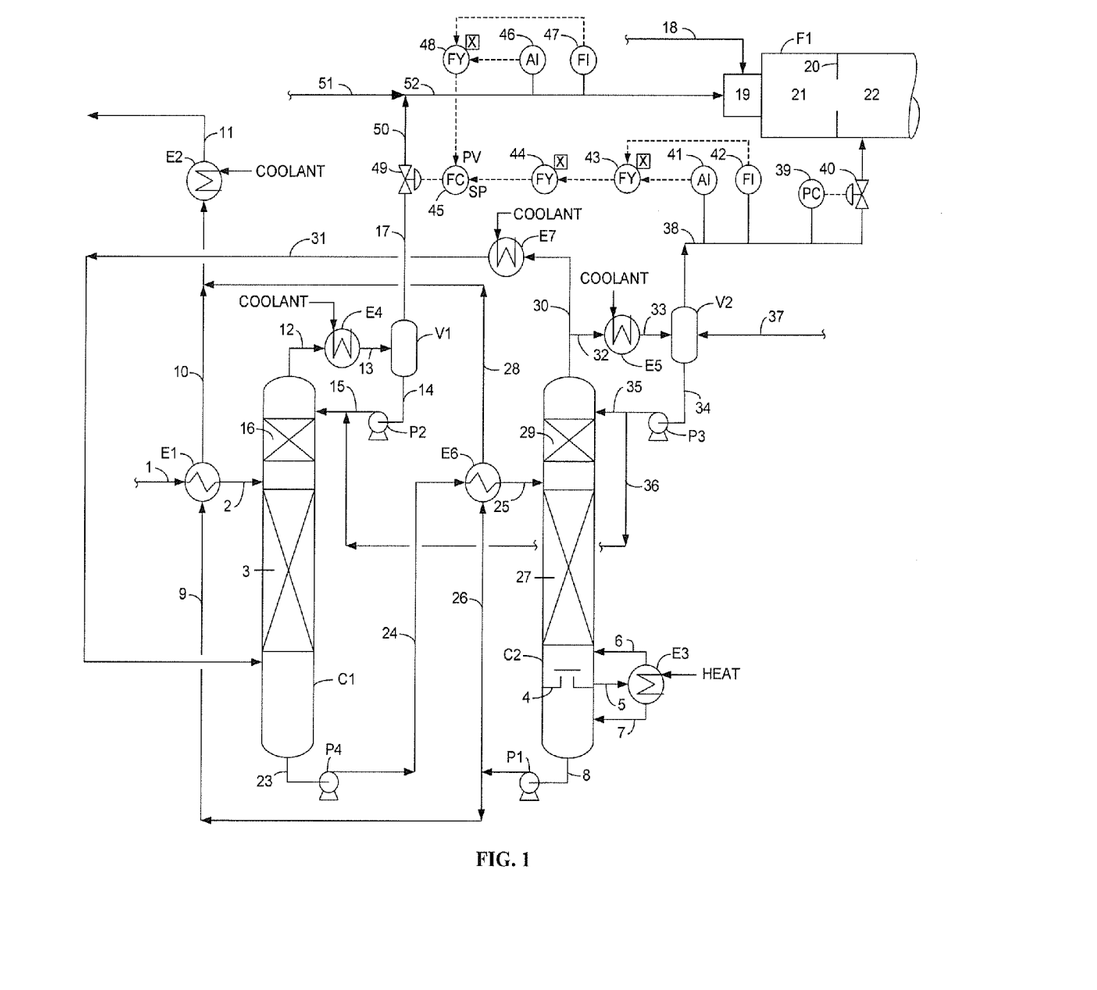
FIGS. 1-3 are process flow diagrams illustrating different embodiments of the present invention.

Referring now to FIG. 1, a process according to an embodiment of the present inventions is illustrated. A first regenerator C1 and a second regenerator C2 are used to strip $H_2S$, $CO_2$, and volatile contaminants from a rich solvent stream 1. Each of the first and second regenerators is a fractionating column that uses, for example, mass-transfer packing or trays to strip $H_2S$, $CO_2$, and volatile contaminants from the rich solvent stream. Such stripping is accomplished by maintaining gradients of pressure, temperature and composition across the trays or packing of the regenerators as the downwardly flowing liquid solvent contacts rising carrier vapor.

According to this embodiment, the rich solvent stream 1 is fed to the first regenerator C1 where a first acid gas stream 17 is produced from the top of the first regenerator C1 while a partially regenerated solvent stream 23 is produced from the bottom to an upper section of the second regenerator C2 for further regeneration. A fully regenerated, or lean, solvent stream 9 is produced from the bottom of the second regenerator C2 to be used for further absorption of $H_2S$, $CO_2$, and contaminants from one or more facility streams as explained above. A second acid gas stream 38 is produced from the top of the second regenerator C2 while a second regenerator overhead vapor stream 31, also produced from the top of the second regenerator C2, is routed to the bottom of the first regenerator C1 as carrier vapor for the first regenerator C1. According to the operation of the two-stage regeneration process of the present invention, the first acid gas stream 17 contains substantially all of the volatile contaminants removed, and potentially higher concentrations of $H_2S$ than the second acid gas stream 38, and therefore, is fed to a burner 19 of a first reaction zone 21 of a two-zone Claus reaction furnace F1. The partial second acid gas stream 38 contains negligible volatile contaminants in the rich solvent stream, and potentially higher concentrations of $CO_2$ than the first acid gas stream 17, and therefore is fed to a second reaction zone 22 of the two-zone Claus reaction furnace F1.

Turning to a more detailed description of the process of FIG. 1, the rich solvent stream 1 is optionally preheated against the lean solvent stream 9 from the bottom of the second regenerator C2 in first regenerator cross exchanger E1. The desired operating temperature of first regenerator C1 will determine whether or not the first regenerator cross exchanger E1 is required for a given situation and, if so, the amount of the lean solvent stream 9 from the bottom of regenerator C2 that should be routed to the first regenerator cross exchanger E1. A heated rich solvent stream 2 is then produced to a stripping section 3 of the first regenerator C1. The partially regenerated solvent stream 23 is produced from the bottom of the first regenerator C1 via bottoms pump P4 and transfer line 24 to a stripping section 27 of the second regenerator C2. Optionally, the partially regenerated solvent stream 23 is preheated against a portion of the lean solvent stream 26 in a second regenerator cross exchanger E6 before entering the second regenerator via transfer line 25.

Within the first regenerator C1, vapors comprising carrier vapor (steam), acid gas and volatile contaminants flow upward through a packed or trayed wash, or rectification, section 16. According to this embodiment, said hot vapors exit the top of the first regenerator C1 as a first regenerator overhead vapor stream 12 that is produced to a first regenerator overhead condenser E4. There, the vapors are cooled to condense most of the steam. Suitable coolants include water, heat transfer fluid, forced air or refrigerant. The resultant two-phase mixture of condensate and contaminated acid gas 13 flows to first regenerator reflux accumulator V1 for separating the gaseous and liquid phases. As one common example, condensate 14 containing equilibrium quantities of $H_2S$, $CO_2$ and contaminants is shown returned by reflux pump P2 via reflux line 15 to the wash section 16 of the first regenerator C1 where it serves to capture entrained solvent from the rising vapors. Alternatively, the overhead condensate may be returned to other points within the solvent system, or to external secondary treatment in order to, for example, purge accumulated contaminants or, in the case of many aqueous solutions, maintain water balance. A relatively dry first acid gas stream 17, typically containing 5-7 vol % water depending on the temperature and pressure, flows from first reflux accumulator V1 to a first reaction zone 21 of a two-zone Claus reaction furnace F1 via burner 19 as will be discussed in further detail below.

Downward flowing solvent in the second regenerator C2 is collected below the stripping section 27 via a trapout or chimney tray 4. According to this embodiment, in order to add heat and carrier vapor to the lower section of the second regenerator C2, the solvent collected in the chimney tray 4 flows via line 5 to reboiler E3 where heat from an external heating medium such as steam, heat transfer fluid or flue gas vaporizes a portion of the solvent. The vaporized portion of the solvent, which is primarily steam in the case of aqueous solutions, is returned to the second regenerator C2 via vapor line 6 and flows upward through the second regenerator C2 in countercurrent contact with the falling solvent. Some of the steam condenses within the stripping section to further raise the solvent temperature and counter the endothermic heats of $H_2S$ and $CO_2$ desorption, and the remaining steam acts as a carrier vapor to strip the acid gas from solution by means of partial-pressure reduction. Residual hot solvent 7 flows from reboiler E3 to the bottom of the regenerator.

Within the second regenerator C2, vapors primarily comprising carrier vapor (steam) and acid gas continue to flow upward through the stripping section 27 and the packed or trayed wash section 29. Hot vapors exiting the top of the second regenerator C2 are split into second regenerator overhead vapor streams 30 and 32. The partial second regenerator overhead vapor stream 30 is routed to an optional overhead stream cooler E7, then the second regenerator overhead vapor stream 31 is fed to the bottom of the first regenerator C1 below the stripping section 3 as the carrier vapor which flows upward through the stripping section 3 in countercurrent contact with the falling solvent. The extent of cooling, if any, that is required for the second regenerator overhead vapor stream 30 by overhead stream cooler E7 will depend on the desired operating temperatures of the first regenerator C1 as determined by the nature of the solvent, $H_2S/CO_2$ ratio, and contaminants to be preferentially stripped in the first regenerator C1. The operating temperatures, pressures and mass transfer design of the first regenerator C1 for a given feed may be optimized to maximize desorption of organics and $H_2S$ from the solvent, while minimizing desorption of $CO_2$.

According to this embodiment, the remaining partial hot overhead vapor stream 32 from the top of the second regenerator C2 is routed to a second regenerator overhead condenser E5 which uses a coolant such as water, heat transfer fluid, forced air or refrigerant to cool the hot overhead stream to condense most of the steam. The resultant two-phase mixture of condensate and acid gas 33 flows to second regenerator reflux accumulator V2 for separation of the gaseous and liquid phases. The second acid gas stream 38 is produced from reflux accumulator V2 to the second reaction zone 22 of the two-zone Claus reaction furnace F1. Condensate 34 containing equilibrium quantities of $H_2S$ and $CO_2$ is pumped by reflux pump P3 which normally returns most or all of the stream via reflux line 35 to the wash section 29 of the second regenerator C2 to capture entrained solvent. Optionally, if the first regenerator C1 temperatures are sufficiently low that the first regenerator overhead stream 12 contains negligible amounts of steam, a portion of the condensate 36 from the second regenerator C2 is routed to the wash section 16 of the first regenerator C1 to capture entrained solvent in the first regenerator C1. According to such an embodiment, there may be no need for the first regenerator overhead condenser E4, the first regenerator reflux accumulator V1, the reflux pump P2, or associated equipment, and the first regenerator overhead vapor stream 12 may be routed directly to the first reaction zone 21 of the two-zone Claus reaction furnace F1 as the first acid gas stream.

Optionally, if the plant has a typical hydrogenation-amine Tail Gas Treating Unit (TGTU) to convert any sulfur compounds remaining in the Claus tail gas to $H_2S$ for recycle to the sulfur recovery unit, TGTU acid gas recycle will typically contain a lower concentration of $H_2S$ than the first acid gas stream. In this case, a TGTU acid gas recycle stream 37 is preferably routed to the second reaction zone 22 via second reflux accumulator V2. Similarly, stream 37 may also comprise one or more other extraneous dilute acid gas streams preferably fed to the second reaction zone 22.

The lean solvent exits the bottom of the second regenerator C2 as bottoms product 8 and is pumped by lean solvent pump P1. The lean solvent stream 9 is optionally cooled by the first regenerator cross exchanger E1, and/or companion lean solvent stream 26 is optionally cooled by the second regenerator cross exchanger E6. The partially cooled lean solvent streams from the first and second regenerator cross exchangers are optionally produced via transfer lines 10 and/or 28, respectively, to auxiliary cooler E2 which uses a coolant such as water, heat transfer fluid, forced air or refrigerant to produce a fully cooled lean solvent stream 11 that is then recirculated to the facility absorber(s).

Turning to the operation of the two-zone Claus Reaction furnace F1, the first acid gas stream 17 comprises a water-saturated acid gas, typically containing 5-7 vol % water depending on the operating temperatures and pressures of the first regenerator overhead condenser E4. The flow of the first acid gas stream 17 is controlled by a first control valve 49 and the control valve outlet stream 50 optionally combines with extraneous gas stream 51 which may contain contaminants such as $NH_3$, HCN, methanol or other organic materials and contaminants from various facility sources. Such materials generally require the higher temperatures of the first reaction zone 21 of the Claus reaction furnace F1 for effective destruction. The acid gas stream 50 and extraneous gas stream 51 combine to form combined first acid gas stream 52 that is fed to the burner 19. In the burner 19, the combined first acid gas stream 52 is mixed with an $O_2$ source 18 at sufficiently elevated temperature for combustion in the first reaction zone 21. The $O_2$ source 18 may be air, air enriched with $O_2$, or essentially pure $O_2$.

The feed of the second acid gas stream 38, a relatively dry acid gas stream, is controlled by a second control valve 40 before entering the second reaction zone 22 of the Claus reaction furnace F1. As is conventional practice in the design of two-zone Claus reaction furnaces, most notably where the destruction of acid gas streams containing $NH_3$ from sour water strippers is desired in the first zone, the two reaction furnace zones are separated by a refractory checkerwall or choke ring 20. The function of such separation is to (1) reduce short-circuiting for better mixing in the first reaction zone, (2) improve mixing in the second reaction zone by virtue of the temporary velocity increase within the transition, (3) reflect back radiant heat for higher temperatures within the first reaction zone, and (4) partially shield the inlet tubesheet of the downstream waste heat boiler from radiation.

With reference again to Equation 2, Claus stoichiometry nominally limits the $O_2$ to that required to oxidize one third of the $H_2S$, disregarding minor thermal dissociation of $H_2S$ to $S_x$ and $H_2$. Consequently, the approach to oxidizing conditions in the first reaction zone is generally determined by the split of $H_2S$ between the first and second zones, and the first zone atmosphere is generally considered to be an oxidizing condition if one-third or less of the total $H_2S$ is fed to the first reaction zone. However, actual oxidizing conditions are generally to be avoided due to the potential for undesirable oxidation of $SO_2$ to $SO_3$ which will typically exist as sulfuric acid ($H_2SO_4$) vapor downstream of the reaction furnace. The presence of $H_2SO_4$ downstream can result in catalyst deactivation with aluminum sulfate, precipitation of ammonium sulfate in the presence of residual $NH_3$, and severe corrosion upon condensation in the sulfur condensers.

In general, it has been determined that the optimum split is that which routes about 40% of the total $H_2S$ to the first zone of the reaction furnace to ensure slightly reducing conditions. However, other splits within the range of 30-50% of the total $H_2S$ to the first zone may often prove suitable, if not optimal.

While it may be intuitive to define the split in terms of routing X % of total $H_2S$ to the first zone of the reaction furnace, from a control standpoint it is perhaps more convenient to define an equivalent relationship between X % of total $H_2S$ to the first zone and Y % of total $H_2S$ to the second zone.

With reference again to FIG. 1, an embodiment of a process control scheme is illustrated. The second control valve 40 on the second acid gas stream 38 to the second reaction zone 22, in combination with a pressure controller (PC) 39, maintains a constant system backpressure. The first control valve 49 adjusts the flow of first acid gas stream 17 to first reaction zone 21 to achieve a constant $H_2S$ split. To accomplish this, a first continuous online analyzer (AI) 46 measures the $H_2S$ concentration of combined first acid gas stream 52 to first reaction furnace zone 21, and a first flow meter (FI) 47 measures the flow rate of the combined first acid gas stream 52. A first multiplier (FY) 48 multiplies the signal from the first continuous online analyzer 46 by the signal from the first flow meter 47 to generate an output signal proportional to the mass of $H_2S$ that is fed to the first reaction zone, and which becomes the process variable feedback signal for flow controller (FC) 45 which adjusts the first control valve 49 on the acid gas stream 17 from the first regenerator C1.

Similarly, a second continuous online analyzer (AI) 41 measures the $H_2S$ concentration of the second acid gas stream 38 to the second reaction furnace zone 22, and a second flow meter (FI) 42 measures the flow rate of the second acid gas stream 38. A second multiplier (FY) 43 multiplies the signal from second continuous online analyzer 41 by the signal from second flow meter 42 to generate an output signal proportional to the mass of $H_2S$ that is fed to the second reaction zone 22. A third multiplier (FY) 44 then multiplies the output signal from the second multiplier (FY) 43 by a constant factor F which achieves the desired split by generating an output signal which determines the set point (SP) for flow controller (FC) 45.

If, as previously defined, X represents the percentage of total $H_2S$ to first reaction zone 21 and Y represents the percentage of total $H_2S$ to second reaction zone 22, then F is defined by Equation 3 as follows:

$$F=X/Y=X/(100-X) \quad (3)$$

For the generally optimal case wherein X=40%, for example, then F=40/60=⅔.

In another embodiment where, for example, the total feed to the Claus reaction furnace may contain high $CO_2$ but very low hydrocarbons, it may be possible to debottleneck the Claus unit by limiting residual $H_2S$ in the first regenerator bottoms so that the second regenerator acid gas may be sent directly to the TGTU. In another related embodiment, the second regenerator acid gas may be recycled to the upstream sour gas absorber. In yet another related embodiment during periods of high turndown, $H_2S$ enrichment of the first regenerator overhead can be further increased more than is normally practical when higher second regenerator overhead $H_2S$ concentrations are tolerable by virtue of ample spare capacity in the TGTU or upstream sour gas absorber.

It will be recognized by those skilled in the art that other control schemes for maintaining the proper $H_2S$ split are possible. It will also be recognized that the fundamental concept of preferentially routing problematic combustibles in the acid gas stream to the first zone of a two-zone Claus reaction furnace by staged regeneration, as described herein using heat regeneration of an alkanolamine as an example, can be applied to a wide variety of physical and chemical solvent systems in which the rich solvent is variously regenerated by means of heat, pressure reduction, partial-pressure reduction by means of a carrier vapor, and combinations thereof. It will further be appreciated that while no particular control schemes are illustrated for operation of the first and second regenerators and associated equipment, such control schemes including the corresponding control equipment are known to one of ordinary skill in the art. Still further it will be recognized that many generic variations in process configurations with regard to such means as heat integration, flashing, semipermeable membranes, vapor recompression, power recovery, etc., to suit particular circumstances will be evident to those skilled in the art.

Figure 2:
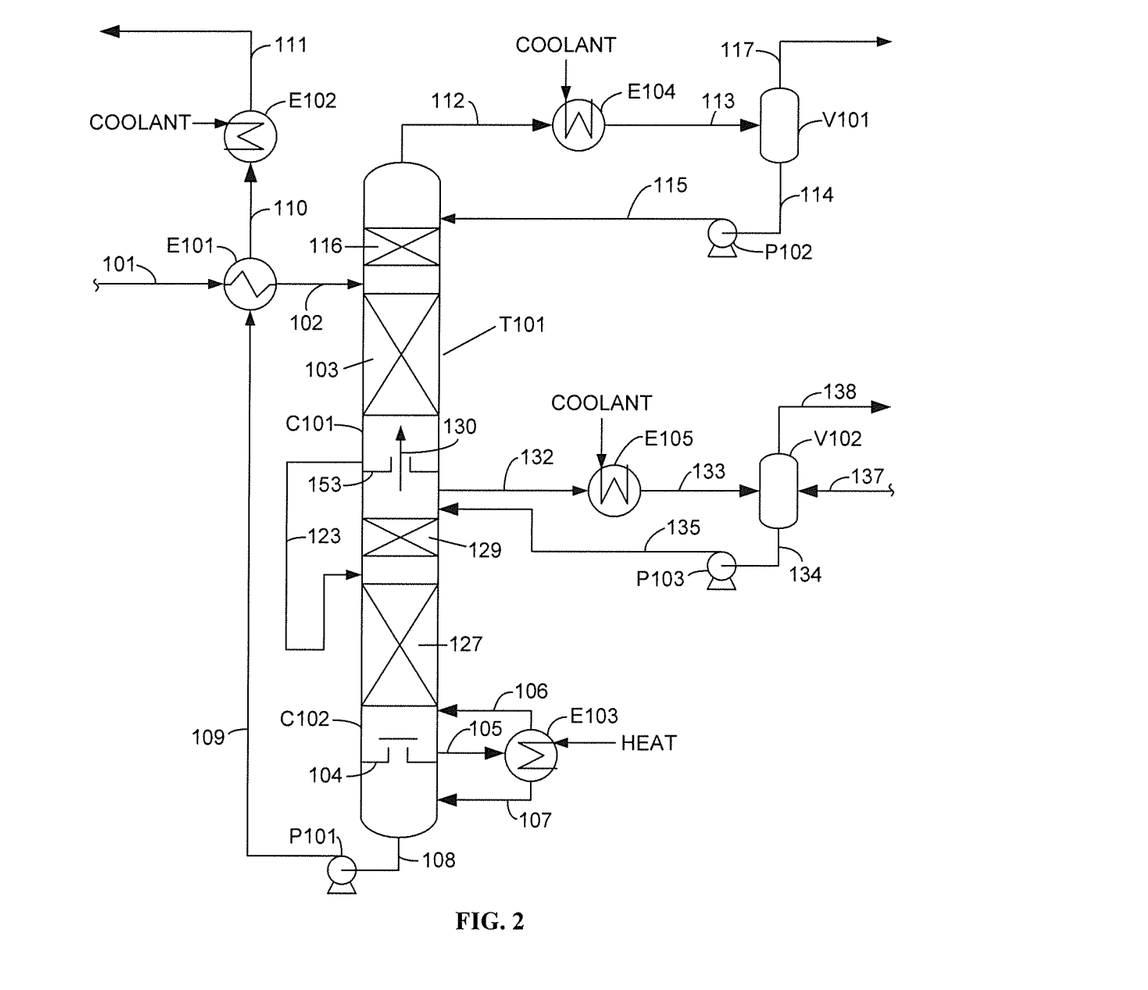

Referring now to FIG. 2, a simplified embodiment of the present invention is illustrated. As before, for the sake of example, the solvent is assumed to be an aqueous alkanolamine solution. According to this embodiment, a single fractionating tower T101 includes a first regenerator section C101 and a second regenerator section C102 arranged in a stacked configuration. The rich solvent stream 101 is fed to the first regenerator section C101, a first acid gas stream 117 is produced from an upper section of the fractionating tower T101 at the top of the first regenerator section C101, a second acid gas stream 138 is produced from the middle section of the fractionating tower T101 at the top of the second regenerator section C102, and a regenerated or lean solvent stream 109 is produced from a bottom section of the fractionating tower T101 at the bottom of the second regenerator section C102 to be reused for continued absorption of $H_2S$, $CO_2$, and contaminants from one or more facility streams as explained above. In this embodiment of the invention, as with the previous embodiment, the first acid gas stream 117 contains substantially all volatile contaminants, and potentially higher concentrations of $H_2S$ than the second acid gas stream 138, and therefore, is fed to the first reaction zone of the two-zone Claus reaction furnace (not shown) while the second acid gas stream 138 contains negligible contaminants and potentially higher concentrations of $CO_2$ than the first acid gas stream 117, and therefore, is fed to the second reaction zone of the two-zone Claus reaction furnace (not shown).

Turning to a more detailed description of the process of FIG. 2, the rich solvent stream 101 is preheated against the lean solvent stream 109 from the bottom of the fractionating tower T101 in cross exchanger E101. A heated rich solvent stream 102 is then produced to an upper stripping section 103 of the fractionating tower T101 at the first regenerator section C101. The partially regenerated solvent stream is produced from the bottom of the first regenerator section C101 by transfer line 123 to a lower stripping section 127 of the fractionating tower T101 at the second regenerator section C102.

Within the first regenerator section C101, vapors comprising a carrier vapor (steam), acid gas and volatile contaminants flow upward through an upper wash section 116. Hot vapors exit the top of the first regenerator C101 as a first overhead vapor stream 112 that is produced to first overhead condenser E104. There, the vapors are cooled to condense most of the steam. Suitable coolants include water, heat transfer fluid, forced air or refrigerant. The resultant two-phase mixture of condensate and acid gas 113 flows to first reflux accumulator V101 for separating the gaseous and liquid phases. An overhead condensate stream 114 containing equilibrium quantities of $H_2S$, $CO_2$ and contaminants is pumped by reflux pump P102 which normally returns most or all of the condensate via reflux line 115 to the upper wash section 116 of the first regenerator section C101 where it serves to capture entrained solvent from the rising vapors. A relatively dry first acid gas stream 117, typically containing 5-7 vol % water depending on the temperature and pressure, flows from reflux accumulator V101 to a first reaction zone of a two-zone Claus reaction furnace (not shown) as discussed in the previous embodiment.

The partially regenerated solvent stream from the bottom of the first regenerator section is collected at chimney tray 153, and is transferred by a transfer line 123 to the lower stripping section 127 of the second regenerator section C102. Downward flowing solvent in the second regenerator section C102 is collected below the lower stripping section 127 via a trapout tray 104 and flows via line 105 to reboiler E103 where heat from an external heating medium such as steam, heat transfer fluid or flue gas vaporizes a portion of the solvent. The vaporized portion of the solvent, which is primarily steam, is returned to the second regenerator section C101 via vapor line 106 and flows upward through the fractionating tower T101 in countercurrent contact with the falling solvent. Some of the steam condenses within the lower stripping section 127 to further raise the solvent temperature and counter the endothermic heats of $H_2S$ and $CO_2$ desorption, and the remaining steam acts as a carrier vapor to strip the acid gas from solution by means of partial-pressure reduction. Residual hot solvent 107 flows from reboiler E103 to the bottom of the regenerator.

Within the second regenerator section C102, vapor primarily comprising a carrier vapor (steam) and acid gas continues to flow upward through the lower stripping section 127 and an upper wash section 129 of the second regenerator section C102. A portion of the overhead vapor from the second regenerator section C102 flows through the chimney tray 153 as a vapor stream 130 to the upper stripping section 103 and the upper rectification section 116 of the first regenerator section C101 in countercurrent contact with the falling solvent and reflux. The remaining portion of the overhead vapor from the second regenerator section C102, stream 132, is drawn from the middle section of the fractionating tower T101 and routed to a middle overhead condenser E105 which uses a coolant such as water, heat transfer fluid, forced air or refrigerant to cool the middle overhead stream 132 to condense most of the steam. The resultant two-phase mixture of condensate and acid gas 133 flows to middle reflux accumulator V102 for separation of the gaseous and liquid phases. The second acid gas stream 138 is produced from middle reflux accumulator V102 to the second reaction zone of the two-zone Claus reaction furnace (not shown) as described in the previous embodiment. A middle condensate stream 134 containing equilibrium quantities of $H_2S$ and $CO_2$ is pumped by middle reflux pump P103 which normally returns the stream to the upper wash section 129 of the second regenerator section C102 at the middle of the fractionating tower T101 via middle reflux line 135 to capture entrained solvent.

The lean solvent exits the bottom of the second regenerator section C102 as bottoms product 108 and is pumped by lean solvent pump P101. The lean solvent stream 109 then flows to cross exchanger E101 which preheats the rich solvent stream 101 produced to the fractionating tower T101 as explained above. The partially cooled lean solvent 110 from the cross exchanger is further cooled in auxiliary cooler E102 which uses a coolant such as water, heat transfer fluid, forced air or refrigerant to produce a fully cooled lean solvent stream 111 that is then recirculated to the facility absorber(s).

As discussed in the previous embodiment, if the plant has a typical hydrogenation-amine Tail Gas Treating Unit (TGTU) to convert any sulfur compounds remaining in the Claus tail gas to $H_2S$ for recycle to the sulfur recovery unit, TGTU acid gas recycle will typically contain a lower concentration of $H_2S$ than the first regenerator overhead stream. In this case, a TGTU acid gas recycle stream 137 is optionally routed to the second reaction zone (not shown) via the middle reflux accumulator V102.

Figure 3:
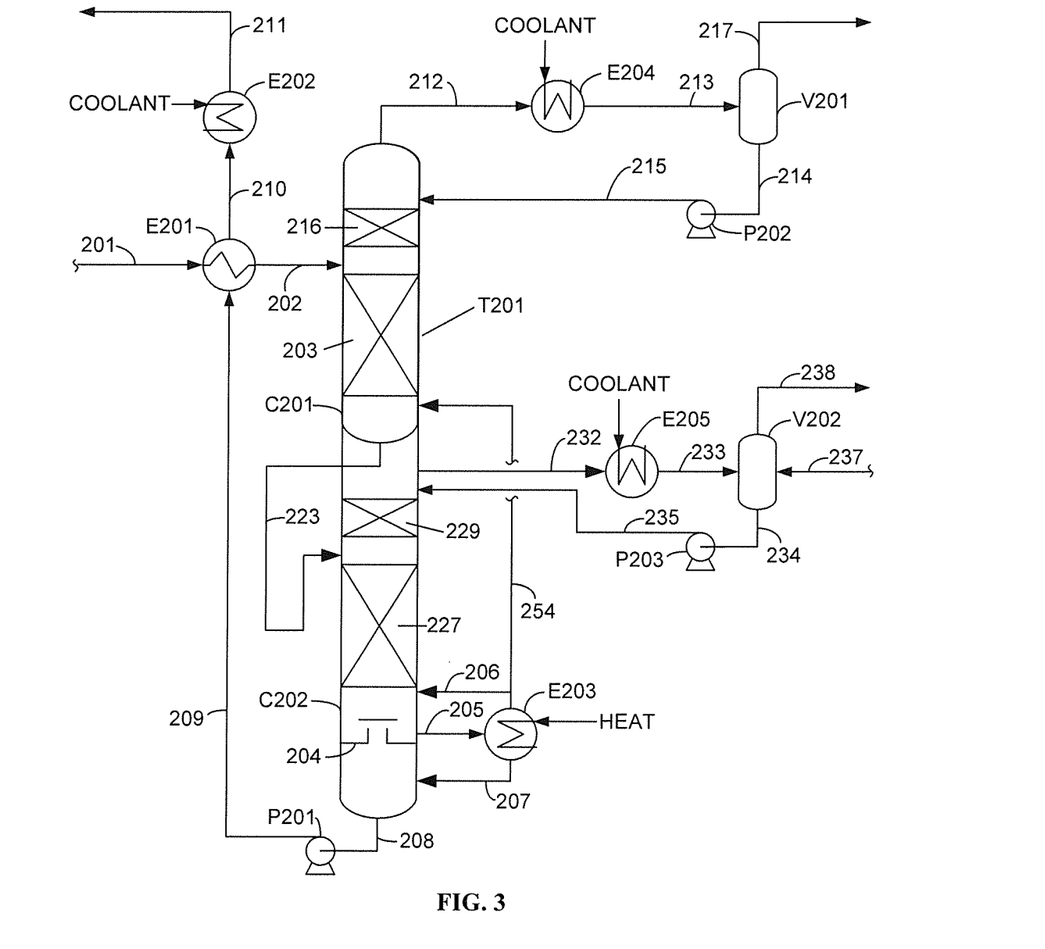

Referring now to FIG. 3, yet another alternative embodiment of the present invention is illustrated. According to this embodiment, a single fractionating tower T201 includes a first regenerator section C201 and a second regenerator section C202 arranged in a stacked configuration similar to the embodiment of FIG. 2. However, in this embodiment, there is no chimney tray between the first and second regenerator sections, but rather, the first and second regenerator sections are physically segregated.

According to this embodiment, a rich solvent stream 201 is preheated against the lean solvent stream 209 from the bottom of the fractionating tower T201 in cross exchanger E201. A heated rich solvent stream 202 is then produced to an upper stripping section 203 of the fractionating tower T201 at the first regenerator section C201. The partially regenerated solvent stream is produced from the bottom of the first regenerator section C201 by transfer line 223 to a lower stripping section 227 of the fractionating tower T201 at the second regenerator section C202.

Within the first regenerator section C201, vapors comprising a carrier vapor (steam), acid gas and volatile contaminants flow upward through an upper wash section 216. Hot vapors exit the top of the first regenerator C201 as an overhead vapor stream 212 that is produced to first overhead condenser E204. There, the vapors are cooled to condense most of the steam. The resultant two-phase mixture of condensate and acid gas 213 flows to first reflux accumulator V201 for separating the gaseous and liquid phases. An overhead condensate stream 214 containing equilibrium quantities of $H_2S$, $CO_2$ and contaminants is pumped by reflux pump P202 which normally returns the condensate via reflux line 215 to the upper wash section 216 of the first regenerator section C201 where it serves to capture entrained solvent from the rising vapors. A first acid gas stream 217 flows from reflux accumulator V201 to a first reaction zone of a two-zone Claus reaction furnace (not shown) as discussed in the previous embodiments.

The partially regenerated solvent stream is collected at the bottom of the first regenerator section C201 and flows via transfer line 223 to the lower stripping section 227 of the second regenerator section C202. Downward flowing solvent in the second regenerator section C202 is collected below the lower stripping section 227 via a trapout tray 204 and flows via line 205 to reboiler E203 where heat from an external heating medium such as steam, heat transfer fluid or flue gas vaporizes a portion of the solution water to steam. A portion of the steam is returned to the second regenerator section C201 via vapor line 206 and flows upward through the fractionating tower T201 in countercurrent contact with the falling solvent. Some of the steam condenses within the lower stripping section 227 to further raise the solvent temperature and counter the endothermic heats of $H_2S$ and $CO_2$ desorption, and the remaining steam acts as a carrier vapor to strip the acid gas from solution by means of partial-pressure reduction. Residual hot solvent 207 flows from reboiler E203 to the bottom of the second regenerator section C202. According to this embodiment, the remaining portion of the steam generated by reboiler E203 is routed via vapor bypass line 254 to the bottom of the first regenerator section C201 to act as carrier vapor in the first regenerator section C201. This embodiment may be desirable where reaction kinetics favor desorption of $H_2S$ over $CO_2$.

Within the second regenerator section C202, vapors primarily comprising steam and acid gas continue to flow upward through the lower stripping section 227 and an upper wash section 229. A middle overhead vapor stream 232 is drawn from the top of the second regenerator section C202 and routed to a middle overhead condenser E205 which uses a coolant to cool the middle overhead stream 232 to condense most of the steam. The resultant two-phase mixture of condensate and acid gas 233 flows to middle reflux accumulator V202 for separation of the gaseous and liquid phases. The second acid gas stream 238 is produced from middle reflux accumulator V202 to the second reaction zone of the two-zone Claus reaction furnace (not shown) as described in the previous embodiments. A middle condensate stream 234 containing equilibrium quantities of $H_2S$ and $CO_2$ is pumped by middle reflux pump P203, normally returning the stream to the upper wash section 229 of the second regenerator section C202 at the middle of the fractionating tower T201 via middle reflux line 235 to capture entrained solvent.

The lean solvent exits the bottom of the second regenerator section C202 as bottoms product 208 and is pumped by lean solvent pump P201. The lean solvent stream 209 then flows to cross exchanger E201 which preheats the rich solvent stream 201 produced to the fractionating tower T201 as explained above. The partially cooled lean solvent 210 from the preheat exchanger is further cooled in auxiliary cooler E202 which uses a coolant such as water, heat transfer fluid, forced air or refrigerant to produce a fully cooled lean solvent stream 211 that is then recirculated to the facility absorber(s) for continued recovery of $H_2S$ and $CO_2$.

As discussed in the previous embodiments, if the plant has a typical hydrogenation-amine Tail Gas Treating Unit (TGTU) to convert any sulfur compounds remaining in the Claus tail gas to $H_2S$ for recycle to the sulfur recovery unit, TGTU acid gas recycle will typically contain a lower concentration of $H_2S$ than the first acid gas stream. In this case, a TGTU acid gas recycle stream 237 is optionally routed to the second reaction furnace zone (not shown) via the middle reflux accumulator V202.

For the embodiments of FIGS. 2 and 3, the details of the two-zone Claus reaction furnace are not explained as they are essentially the same as described in the previous embodiment. Furthermore, the control equipment and control schemes for controlling the operation of the fractionating towers of FIGS. 2 and 3 are not explained, since such control schemes and equipment are known to one of ordinary skill in the art.

It has been determined that where ethanolamines are used as the solvent, and most likely other solvents, staged regeneration can be effectively achieved with the process flow scheme illustrated by FIG. 2 or 3, with considerably reduced capital and operating costs compared with the embodiment of FIG. 1.

Figure 4:
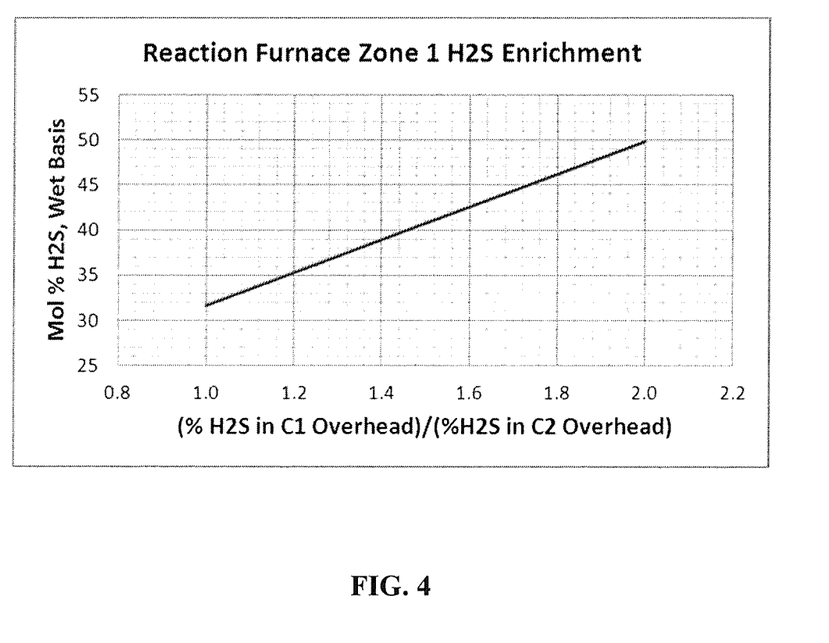
FIG. 4 is a graph illustrating hypothetical $H_2S$ enrichment as a function of the ratio of $H_2S$ concentrations in the two acid gas streams generated by the staged regeneration process of this invention.

FIG. 4 is a hypothetical example, based on nominal reaction stoichiometry, of the extent of $H_2S$ enrichment of the first acid gas stream as a function of the ratio of $H_2S$ concentration in the first acid gas stream to that in the second acid gas stream. Assumptions include (1) overall $H_2S/CO_2 \approx \frac{1}{2}$ in the combined first and second acid gas streams with 5% $H_2O$, (2) virtually all residual sulfur in the Claus tail gas is recovered in a typical hydrogenation-amine TGTU as $H_2S$ recycled to the second reaction zone, (3) 40% of the total $H_2S$ including TGTU recycle is fed to the first reaction zone, (4) 94% Claus sulfur recovery efficiency is achieved, and (5) 15% of the $CO_2$ fed to the TGTU absorber is recycled to the SRU, where gas concentrations are expressed on a molar wet basis. Significant $H_2S$ enrichment will typically require optimization of the first regenerator mass transfer stages and process conditions to capitalize on favorable differences in reaction kinetics, and indicated enrichment levels may not always be achievable.

The present invention will now be described with reference to the following example.

EXAMPLE

A computerized process simulation was performed using the process configuration illustrated in FIG. 2 and including a TGTU stream. Methyldiethanolamine (MDEA) was used as the solvent and the simulation assumed a Claus sulfur recovery efficiency of 92.0%. The relative first and second acid gas rates were adjusted such that the first acid gas stream to the first reaction zone of the reaction furnace accounted for 40% of the total $H_2S$ fed to the reaction furnace, including the TGTU recycle stream. The compositions and flow rates of key streams are set forth in the following table.

| | Stream (FIG. 2) | | | | |
|---|---|---|---|---|---|
| Component | 101 Rich Solvent | 109 Lean Solvent | 117 1st Acid Gas | 137 TGTU Acid Gas | 138 2nd Acid Gas |
| $H_2S$, mol % | 1.41 | 0.08 | 32.02 | 18.07 | 27.31 |
| $CO_2$, mol % | 2.81 | 0.02 | 62.73 | 76.93 | 67.67 |
| $H_2O$, mol % | 85.23 | 88.88 | 4.95 | 5.00 | 5.02 |
| MDEA, mol % | 10.54 | 11.02 | — | — | — |
| BTEX (equimolar), mol % | 0.01 | — | 0.30 | — | — |
| Total, mol % | 100.00 | 100.00 | 100.00 | 100.00 | 100.00 |
| Total, lbmol/hr | 18,723 | 17,911 | 339 | 120 | 596 |

For the simulation, the stripping conditions were adjusted to achieve relative first and second acid gas rates based on equilibria alone. According to the example, by preferentially producing the contaminants in the first acid gas stream, and by maintaining a somewhat higher concentration of $H_2S$ in the first acid gas stream compared to the second acid gas stream, the performance of the Claus furnace was improved. Numerous similar simulations were performed for MEA, DEA and MDEA solutions for varying process conditions and contaminant loadings, and in all cases, substantially all of the contaminants were preferentially stripped in the first regenerator section such that the second acid gas stream contained negligible amounts in terms of adverse Claus unit impact.

While the example predicts relative $H_2S$ concentrations based solely on equilibria, often further $H_2S$ enrichment of the first acid gas can be achieved by optimized limitation of mass transfer area and residence time to take advantage of favorable desorption reaction kinetics for $H_2S$ over $CO_2$. In general, using the teachings of the present invention, design modifications required to achieve the desired split will be apparent to one of skill in the art. In summary, aspects and embodiments of the present invention will provide one or more of the following advantages over prior art methods and systems:

Substantially all miscellaneous volatile contaminants such as HCN, mercaptans, disulfides, hydrocarbons and other organics are stripped from solution in the first regeneration stage and favorably oxidized, without soot formation, by virtue of higher temperatures and closer approach to oxidizing conditions in the first reaction furnace zone;

Optimizing the approach to oxidizing conditions in the first reaction furnace zone maximizes oxidation of hydrocarbons to $CO_2$, thus minimizing formation of $CS_2$ which contributes to SOx emissions in the absence of a TGTU;

Empirical correlations typically requiring temperatures of 2000-2200° F. for effective destruction of $C_6+$ organics are based on the highly reducing conditions of a single-zone reaction furnace. By oxidizing organics in the only-slightly reducing atmosphere of the first reaction zone, effective destruction is often achieved at lower temperatures;

Extreme turndown in terms of $H_2S$ concentration or rate is achievable by enrichment of the acid gas to the first reaction zone with supplemental hydrocarbon fuel without risk of soot formation, or the need for a constant-quality fuel such as natural gas or propane since the only basis for optimization of combustion air rate is the Claus tail gas $H_2S/SO_2$ ratio and/or TGTU residual hydrogen ($H_2$);

In some cases, some of the $CO_2$ in the overhead gas from second regenerator C2 will be re-absorbed in the first regenerator by virtue of its stronger acidity relative to $H_2S$, while thus tending to spring, or desorb, additional $H_2S$, and thus enriching the feed gas to the first zone with regard to $H_2S$, with favorable increase in flame temperature;

Common provisions to flash rich solvent upstream of a conventional single-stage regenerator to reduce organic contamination of the acid gas can often be greatly simplified, or even eliminated;

Existing single-stage regeneration systems can be retrofitted while reusing most of the existing equipment; and Stated benefits are normally achievable without significant additional regeneration heat, and with lower incremental capital cost than for the alternatives.

While the present invention has been illustrated and described with reference to certain exemplary embodiments, those of ordinary skill in the art would appreciate that various modifications and changes can be made to the described embodiments without departing from the spirit and scope of the present invention, as defined in the following claims.

What is claimed is:

1. A method for regenerating a rich solvent stream comprising solvent, $H_2S$, $CO_2$, and an amount of at least one volatile contaminant by using a carrier vapor to remove at least a portion of each of the $H_2S$, the $CO_2$, and the at least one volatile contaminant, thereby producing a lean solvent stream, wherein the $H_2S$, $CO_2$, and the at least one contaminant removed are to be fed to a Claus sulfur recovery unit of the type including a two-zone reaction furnace comprising first and second reaction zones, the method comprising:

feeding the rich solvent stream to a regenerator to produce the lean solvent stream from a lower section of the regenerator, an overhead vapor stream from an upper section of the regenerator, and a middle vapor stream from a middle section of the regenerator, wherein the overhead vapor stream comprises carrier vapor, $H_2S$, $CO_2$, and volatile contaminant and the middle vapor stream comprises carrier vapor, $H_2S$, and $CO_2$;

cooling the overhead vapor stream to condense substantially all of the carrier vapor in the overhead vapor stream, thereby producing an overhead condensate stream and a first acid gas stream comprising $H_2S$, $CO_2$, and substantially all of the amount of the at least one volatile contaminant removed from the rich solvent stream;

feeding the first acid gas stream to the first reaction zone of the two-zone reaction furnace;

cooling the middle vapor stream to condense substantially all of the carrier vapor in the middle vapor stream, thereby producing a middle condensate stream and a second acid gas stream comprising $H_2S$ and $CO_2$;

feeding the second acid gas stream to the second zone of the two-zone reaction furnace;

vaporizing a portion of a liquid stream from the lower section of the regenerator to produce a carrier vapor stream; and feeding the carrier vapor stream to the regenerator.

2. The method of claim 1, wherein at least a portion of the carrier vapor stream is fed to the lower section of the regenerator.

3. The method of claim 1, wherein at least a portion of the carrier vapor stream is fed to the middle section of the regenerator.

4. A method for regenerating a rich solvent stream comprising solvent, $H_2S$, $CO_2$, and an amount of at least one volatile contaminant by using a carrier vapor to remove at least a portion of each of the $H_2S$, the $CO_2$, and the at least one volatile contaminant, thereby producing a lean solvent stream, wherein the $H_2S$, $CO_2$, and the at least one contaminant removed are to be fed to a Claus sulfur recovery unit of the type including a two-zone reaction furnace comprising first and second reaction zones, the method comprising:

feeding the rich solvent stream to a first regenerator to produce a partially regenerated solvent stream from a lower section of the first regenerator and a first overhead vapor stream from an upper section of the first regenerator, wherein the first overhead vapor stream comprises carrier vapor, $H_2S$, $CO_2$, and volatile contaminant;

cooling the first overhead vapor stream to condense substantially all of the carrier vapor in the first overhead vapor stream, thereby producing a first overhead condensate stream and a first acid gas stream comprising $H_2S$, $CO_2$, and substantially all of the amount of the at least one volatile contaminant removed from the rich solvent stream;

feeding the first acid gas stream to the first reaction zone of the two-zone reaction furnace;

feeding the partially regenerated solvent stream to a second regenerator to produce the lean solvent stream from a lower section of the second regenerator and a second overhead vapor stream from an upper section of the second regenerator, wherein the second overhead vapor stream comprises carrier vapor, $H_2S$, and $CO_2$;

cooling at least a portion of the second overhead vapor stream to condense substantially all of the carrier vapor in the portion of the second overhead vapor stream, thereby producing a second overhead condensate stream and a second acid gas stream comprising $H_2S$ and $CO_2$;

feeding the second acid gas stream to the second zone of the two-zone reaction furnace;

vaporizing a portion of a liquid stream from the lower section of the second regenerator to produce a carrier vapor stream; and feeding at least a portion of the carrier vapor stream to the lower section of the second regenerator.

5. The method of claim 4, wherein each of the first and second regenerators comprises a fractionating column.

6. The method of claim 4, wherein each of the first and second regenerators comprises a section of a fractionating column.

7. The method of claim 4 wherein the at least a portion of the carrier vapor stream to the lower section of the first regenerator is a first portion of the carrier vapor stream, the method further comprising feeding a second portion of the carrier vapor stream to the first regenerator.

8. The method of claim 4 wherein the at least a portion of the second overhead vapor stream is a first portion of the second overhead vapor stream, the method further comprising feeding a second portion of the second overhead vapor stream to the first regenerator.

* * * * *